(12) United States Patent
Yoshimoto (10) Patent No.: US 8,898,850 B2
(45) Date of Patent: Dec. 2, 2014

(54) WIPER BLADE

(75) Inventor: Takao Yoshimoto, Toyohashi (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 0 days.

(21) Appl. No.: 13/380,180

(22) PCT Filed: May 27, 2011

(86) PCT No.: PCT/JP2011/062749
§ 371 (c)(1),
(2), (4) Date: Dec. 22, 2011

(87) PCT Pub. No.: WO2011/152507
PCT Pub. Date: Dec. 8, 2011

(65) Prior Publication Data
US 2012/0096666 A1    Apr. 26, 2012

(30) Foreign Application Priority Data

May 31, 2010  (JP) ................................. 2010-124924
Nov. 15, 2010 (JP) ................................. 2010-254864

(51) Int. Cl.
*B60S 1/46*    (2006.01)
*B60S 1/38*    (2006.01)

(52) U.S. Cl.
CPC ............... *B60S 1/3801* (2013.01); *B60S 1/381* (2013.01); *B60S 2001/3815* (2013.01); *B60S 2001/3841* (2013.01)
USPC ................ 15/250.44; 15/250.46; 15/250.47; 15/250.201; 15/250.451; 15/250.452

(58) Field of Classification Search
CPC ................. B60S 1/3801; B60S 1/3806; B60S 2001/3813
USPC ............ 15/250.44, 250.46, 250.47, 250.201, 15/250.451, 250.452, 250.453, 250.454, 15/250.361
See application file for complete search history.

(56) References Cited

U.S. PATENT DOCUMENTS 4,095,308 A * 6/1978 Blaiklock et al. .......... 15/250.47
4,896,987 A * 1/1990 Pethers ........................... 403/24
(Continued)

FOREIGN PATENT DOCUMENTS

CN   201264589 Y   7/2009
CN   101500862 A   8/2009
(Continued)

OTHER PUBLICATIONS

International Search Report mailed Aug. 16, 2011 in corresponding PCT Application No. PCT/JP2011/062749.
(Continued)

*Primary Examiner* — Monica Carter
*Assistant Examiner* — Michael Jennings
(74) *Attorney, Agent, or Firm* — Posz Law Group, PLC (57) ABSTRACT

A wiper blade includes a main lever, a movable member, and a rubber blade. The main lever can be coupled to a wiper arm. The main lever includes a longitudinally intermediate portion, a first end defined by at least one of two longitudinal ends, and a first holding portion. The first holding portion is arranged closer to the first end than the longitudinally intermediate portion. The movable member is pivotally coupled to the first end and includes a second holding portion. A rubber blade is held by the first holding portion and the second holding portion. A coupling portion between the main lever and the movable member is located outward from the first holding portion in the longitudinal direction of the main lever.

15 Claims, 9 Drawing Sheets

(56) References Cited

U.S. PATENT DOCUMENTS

| | | | | |
|---|---|---|---|---|
| 5,257,436 A | * | 11/1993 | Yang | 15/250.4 |
| 5,325,563 A | * | 7/1994 | Cayan | 15/250.46 |
| 5,383,248 A | * | 1/1995 | Ho | 15/250.32 |
| 5,435,041 A | * | 7/1995 | Ho | 15/250.32 |
| 5,463,790 A | * | 11/1995 | Chiou et al. | 15/250.201 |
| 5,802,661 A | * | 9/1998 | Miller et al. | 15/250.41 |
| 6,599,051 B1 | * | 7/2003 | Jarasson | 403/326 |
| 2004/0250369 A1 | | 12/2004 | Matsumoto et al. | |
| 2005/0166349 A1 | * | 8/2005 | Nakano et al. | 15/250.201 |
| 2008/0098559 A1 | * | 5/2008 | Machida et al. | 15/250.201 |
| 2008/0313844 A1 | | 12/2008 | Nacamuli | |
| 2011/0126373 A1 | | 6/2011 | Ishida et al. | |
| 2011/0162161 A1 | * | 7/2011 | Amado | 15/250.361 |

FOREIGN PATENT DOCUMENTS

| | | | | |
|---|---|---|---|---|
| CN | 101506012 A | | 8/2009 | |
| DE | 102006035976 A1 | | 2/2008 | |
| EP | 1559623 A2 | * | 8/2005 | B60S 1/38 |
| EP | 1816041 A1 | | 8/2007 | |
| EP | 2006174 A2 | | 12/2008 | |
| GB | 902733 | | 8/1962 | |
| JP | A-2005-022632 | | 1/2005 | |
| JP | A-2008-114746 | | 5/2008 | |
| JP | 2009-184398 A | | 8/2009 | |
| WO | WO 2007/102404 | | 9/2007 | |
| WO | 2008/017532 A1 | | 2/2008 | |
| WO | WO 2010/026967 | | 3/2010 | |
| WO | WO 2010/035794 A1 | | 4/2010 | |
| WO | WO 2010035794 A1 | * | 4/2010 | B60S 1/38 |

OTHER PUBLICATIONS

Japanese Office Action mailed Oct. 22, 2013 for the corresponding JP application No. 2010-124924.

Office Action dated Mar. 14, 2014 issued in corresponding CN patent application No. 201180003016.2.

* cited by examiner

Initial movement direction

Fig.12B

Basal end ⟵ Longitudinal direction ⟶ Distal end

Inserting direction of rubber blade

WIPER BLADE

CROSS REFERENCE TO RELATED APPLICATIONS

This application is a U.S. national stage application of PCT/JP2011/062749 filed on May 27, 2011, and claims priority to, and incorporates by reference, Japanese patent application no. 2010-124924 filed on May 31, 2010 and no. 2010-254864 filed on Nov. 15, 2010.

TECHNICAL FIELD

The present invention relates to a wiper blade that wipes the surface of a front glass or the like of an automobile.

BACKGROUND

Japanese Laid-Open Patent Publication No. 2008-114746 (see FIGS. 8 to 10) describes a wiper blade of a wiper device arranged in a vehicle. The wiper blade includes a main lever coupled to a wiper arm. A cover (movable member) is pivotally coupled to each longitudinal end of the main lever. Two holding hooks arranged at each longitudinal end of the main lever holds a rubber blade. The main lever has a substantially U-shaped cross-section that opens downwards (wiping surface) in a direction orthogonal to the longitudinal direction. The two holding hooks extend toward each other from two side walls of the main lever to hold the upper part of the rubber blade at each longitudinal end of the main lever. The main lever also has an upper wall that connects the two side walls, and the upper wall includes an upper coupling portion extending to the lower side at a position where the holding hooks are formed. The cover includes a lower coupling portion into which the upper coupling portion is inserted. The cover is coupled to the main lever pivotally about a coupling portion of the upper coupling portion and the lower coupling portion as the center.

The coupling portion and the holding hooks are arranged at the same position in the longitudinal direction of the wiper blade. The holding hook is apt to interfering with the coupling of the main lever and the cover. This limits coupling procedures and causes the coupling to be difficult. Further, the coupling portion and the portion of the rubber blade held by the holding hook are stacked over each other in the heightwise direction of the blade and have a two-story structure. This increases the height of the wiper blade.

SUMMARY

It is an object of the present invention to provide a wiper blade in which the main lever and the movable member are easily coupled to each other, and the wiper blade is low.

One aspect of the present invention is a wiper blade including a main lever coupled to a wiper arm. The main lever includes a longitudinally intermediate portion, a first end defined by at least one of two longitudinal ends, and a first holding portion arranged closer to the first end than the longitudinally intermediate portion. A movable member is pivotally coupled to the first end and includes a second holding portion. A rubber blade is held by the first holding portion and the second holding portion. A coupling portion between the main lever and the movable member is located outward from the first holding portion in the longitudinal direction of the main lever.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF EMBODIMENTS

One embodiment embodying the present invention will be hereinafter described according to FIGS. 1 to 7B.

Figure 1:
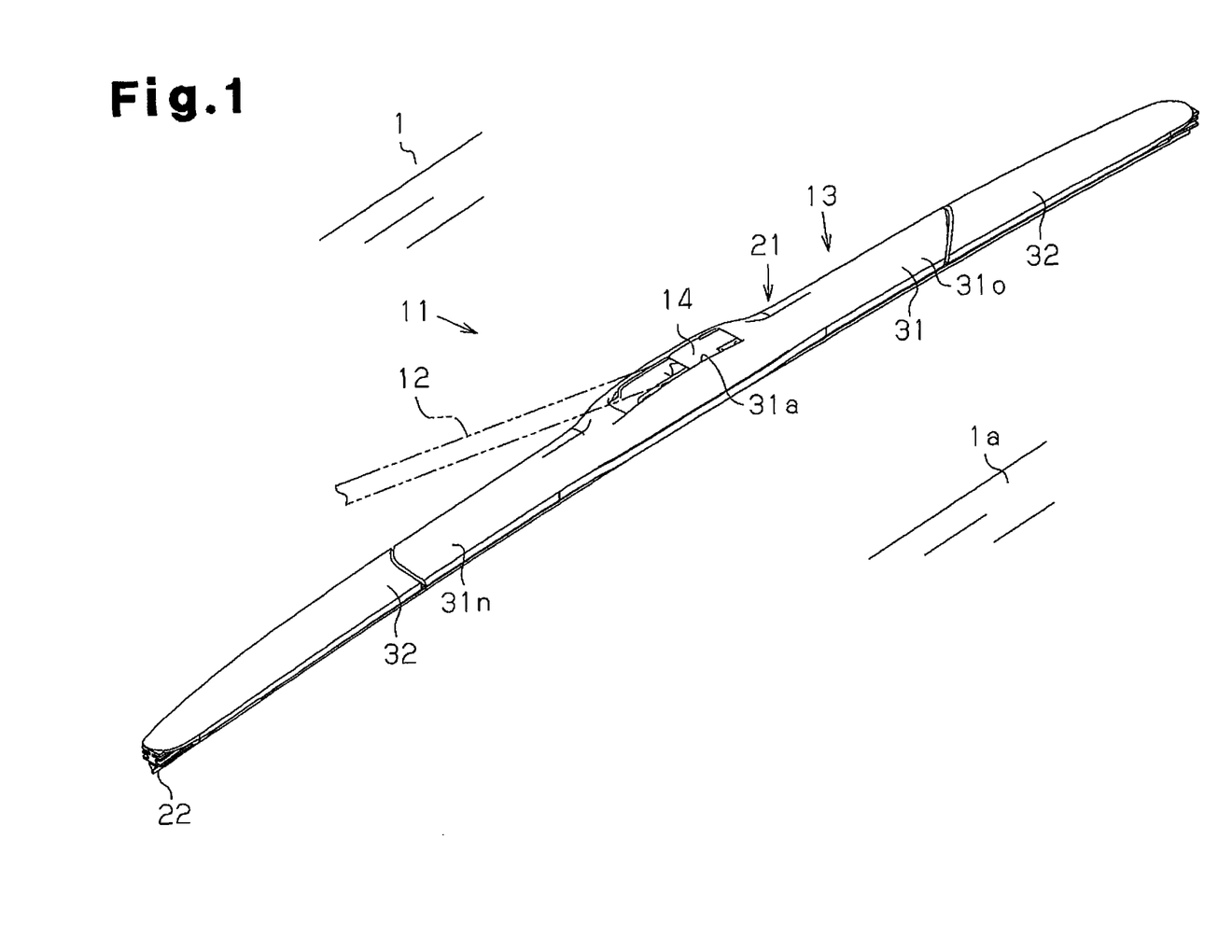
FIG. 1 is a perspective view showing a vehicle wiper according to a first embodiment.

FIG. 1 shows a vehicle wiper 11 for wiping raindrops and the like on to a wiping surface 1a of a front glass (windshield glass) 1 of an automobile. The vehicle wiper 11 includes a wiper arm 12 and a wiper blade 13. A basal end of the wiper arm 12 is fixed to a pivot shaft (not shown), which is pivoted back and forth by a predetermined angle with driving force from a wiper motor (not shown). This pivots the wiper arm 12 back and forth about the pivot shaft. The wiper blade 13 is pivotally coupled to a distal end of the wiper arm 12 by a coupling clip 14. A spring (not shown) is attached to the wiper arm 12 to apply a pushing force that pushes the wiper blade 13 against the wiping surface 1a.

Figures 2A, 2B:
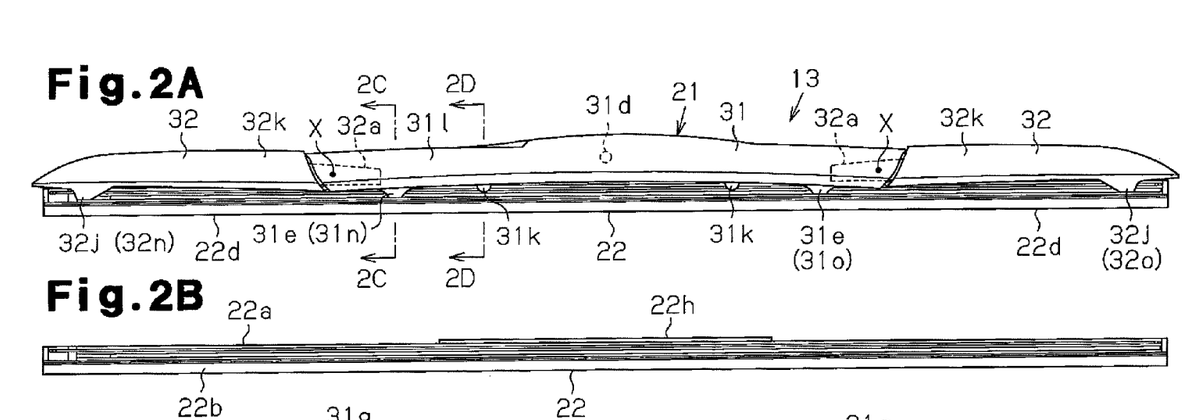
FIG. 2A is a front view of a wiper blade of FIG. 1.
FIG. 2B is a front view of a rubber blade in FIG. 2A.

As shown in FIGS. 2A to 2D, the wiper blade 13 includes a wiper lever 21 and a rubber blade 22. FIG. 2A is a front view showing the wiper blade 13 laid along a plane, that is, in a state in which a wiping surface side end (lower end) of the rubber blade 22 is in contact with the plane.

The wiper lever 21 includes a main lever 31 and two movable members 32. The main lever 31 includes a basal end, a distal end opposite to the basal end, and an intermediate portion. The intermediate portion is pivotally coupled to the distal end of the wiper arm 12 by the coupling clip 14. The basal end is closer to the pivot center of the wiper arm 12 in the main lever 31. The basal ends of the movable members 32 are pivotally coupled to the two ends of the main lever 31 (about axis X in FIG. 2A).

Specifically, the main lever 31 is made of resin material. A cross-section of the main lever 31 orthogonal to the longitudinal direction is substantially U-shaped and opens toward the wiping surface 1a over the entire length in the longitudinal direction. An upper opening 31a (see FIG. 1) extending in the vertical direction (direction perpendicular to wiping surface 1a) is formed at an upper part of the intermediate portion in the longitudinal direction of the main lever 31 (portion farther from the wiping surface 1a). A metal coupling shaft 31d (see FIG. 2A), which connects side walls 31b and 31c, is insert-molded between the two side walls 31b and 31c (see FIGS. 2C and 2D) at positions corresponding to the upper opening 31a of the main lever 31. The distal end of the wiper arm 12 is coupled to the coupling shaft 31d by the coupling clip 14 (see FIG. 1).

Figure 2C:
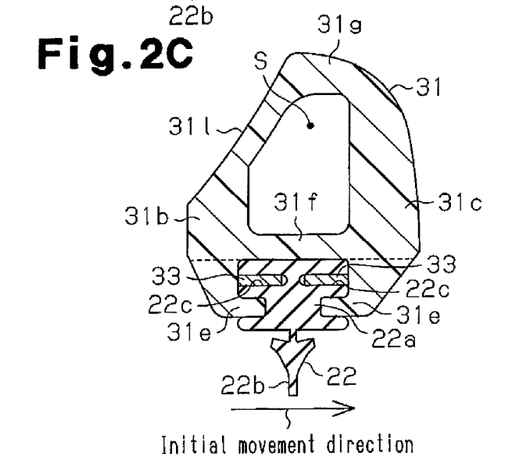
FIG. 2C is a cross-sectional view taken along line 2C-2C in FIG. 2A.

In the main lever 31, a first holding portion 31n is arranged closer to the basal end than the intermediate portion, and a first holding portion 31o is arranged to the distal end than the intermediate portion. The first holding portions 31n and 31o each include two holding hook portions 31e to holding the rubber blade 22 (upper part 22a thereof). The distance between the two first holding hook portions 31e is greater in the longitudinal direction than the length of the upper opening 31a (see FIG. 1). Further, the two first holding hook portions 31e are arranged at positions near each longitudinal end of the main lever 31. As shown in FIG. 2C, the first holding hook portions 31e extend downward from the lower edges of two side walls 31b and 31c of the main lever 31 and include distal ends, which are bent to extend toward each other. Thus, the main lever 31 holds the upper part 22a of the rubber blade 22. As shown in FIG. 2c, a bridge portion 31f is formed at a position where the first holding hook portion 31e is formed in the main lever 31. The bridge portion 31f contacts the upper part 22a (upper surface thereof) of the rubber blade 22 to prevent the rubber blade 22 from moving away from the wiping surface 1a. The bridge portion 31f also connects the two side walls 31b, 31c to ensure the rigidity of the first holding hook portion 31e. As shown in FIG. 2C, the bridge portion 31f is arranged to form a gap S with an upper wall 31g that connects the upper ends of the two side walls 31b and 31c.

Figure 3A:
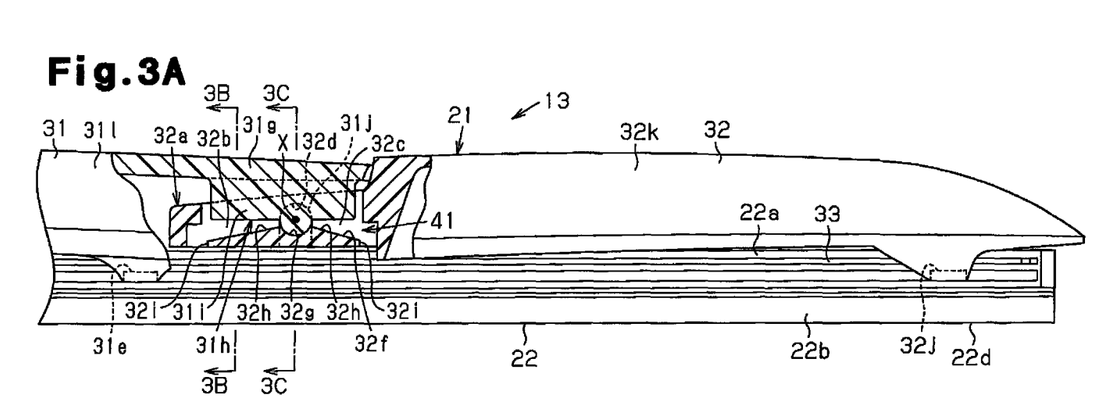
FIG. 3A is an enlarged partial cross-sectional view of the wiper blade of FIG. 1.
Figure 3B:
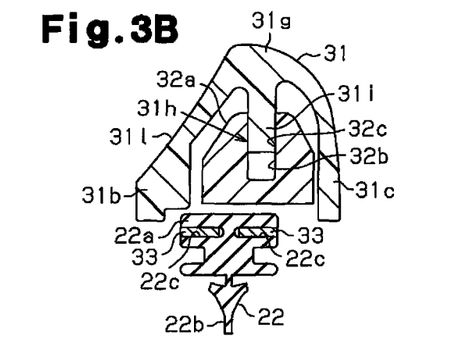
FIG. 3B is a cross-sectional view taken along line 3B-3B in FIG. 3A.
Figure 3C:
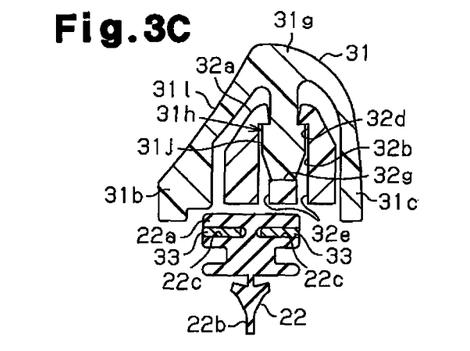
FIG. 3C is a cross-sectional view taken along line 3C-3C in FIG. 3A.
Figure 4:
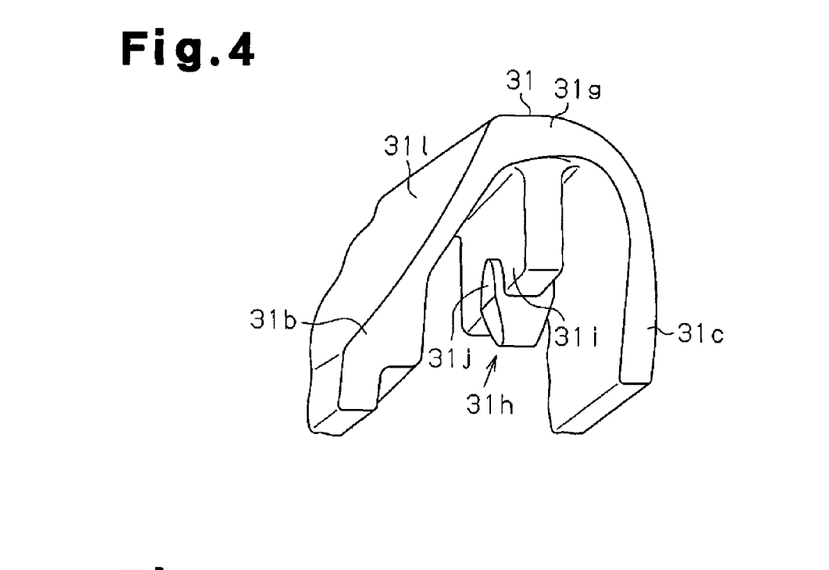
FIG. 4 is a partially enlarged perspective view showing an upper coupling portion of the main lever of FIG. 1.

As shown in FIGS. 3A to 4, an upper coupling portion 31h extending downward from the upper wall 31g is formed at a position outward from the first holding hook portion 31e in the longitudinal direction of the main lever 31. As shown in FIGS. 3A to 4, the upper coupling portion 31h of the first embodiment includes an engagement plate 31i and a pivot shaft 31j. The engagement plate 31i extends along the longitudinal direction of the main lever 31 downward from the upper wall 31g. The pivot shaft 31j is positioned at a distal end at the intermediate portion in the longitudinal direction of the engagement plate 31i and extends in a thicknesswise direction (wiping direction, left and right direction in FIG. 3C) of the main lever 31. Specifically, as shown in FIG. 4, the pivot shaft 31j is substantially cylindrical, and includes a lower half projecting downward from the engagement plate 31i. The projecting portion is tapered such that the width in the thicknesswise direction becomes narrower towards the lower side.

Each movable member 32 is made of a resin material and has a substantially U-shaped cross-section, which opens towards the entire wiping surface 1a in a direction orthogonal to the longitudinal direction. The basal longitudinal end of the movable member 32 is pivotally coupled to the main lever 31 about an axis X (see FIG. 2A) in the two longitudinal ends of the main lever 31. The movable member 32 forms a continuous (small step in the longitudinal direction) outer appearance with the main lever 31.

Specifically, as shown in FIGS. 3A to 3C and FIGS. 5A and 5B, an extended portion 32a extending along the longitudinal direction is formed at the basal end of the movable member 32. The extended portion 32a, which may be arranged in a space surrounded by the two side walls 31b and 31c and the upper wall 31g of the main lever 31, is arranged outward in the longitudinal direction from the first holding hook portion 31e of the main lever 31. The extended portion 32a includes a recessed lower coupling portion 32b that opens upward. The upper coupling portion 31h is inserted into the lower coupling portion 32b from above so that the lower coupling portion 32b and the upper coupling portion 31h are pivotally coupled. The lower coupling portion 32b of the first embodiment includes an engagement plate support 32c and a shaft support 32d arranged in a recessed form along the thicknesswise direction (wiping direction, left and right direction in FIG. 3B) of the movable member 32. The engagement plate 31i is inserted into the engagement plate support 32c so that the engagement plate support 32c can be engaged with the engagement plate 31i in the thicknesswise direction. The pivot shaft 31j is inserted to the shaft support 32d so that the shaft support 32d pivotally supports the pivot shaft 31j. The shaft support 32d of the first embodiment is formed by a lower mold (not shown) that resin-molds the movable member 32.

Figure 5A:
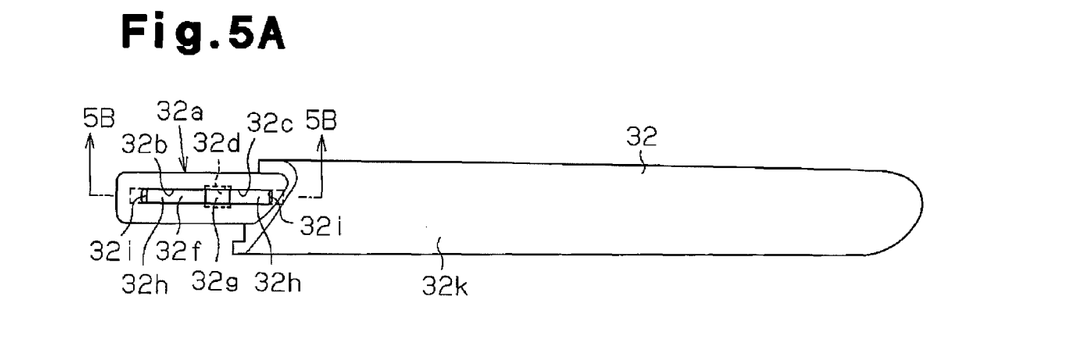
FIG. 5A is a plan view of a movable member of FIG. 1.
Figure 5B:
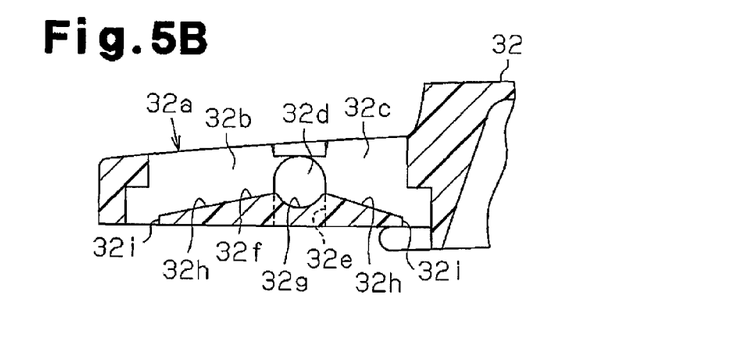
FIG. 5B is a cross-sectional view taken along line 5B-5B in FIG. 5A.

As shown in FIGS. 3C and 5B, a mold separation hole 32e, through which the lower mold passes, is formed at the lower side of the shaft support 32d. When the pivot shaft 31j is inserted into the shaft support 32d, the shaft support 32d inhibits downward movement of the movable member 32 with respect to the main lever 31 (detachment from the main lever 31) while pivotally contacting (slidably contacting) the upper half of the pivot shaft 31j. A support surface 32g having an arcuate recess shaped cross-section is formed at a position of the intermediate portion in the longitudinal direction corresponding with the shaft support 32d at the upper surface of a bottom 32f of the lower coupling portion 32b. The support surface 32g inhibits the movement of the movable member 32 to the upper side with respect to the main lever 31 while pivotally contacting (slidably contacting) the lower half of the pivot shaft 31j. The movable member 32 is thus pivotally coupled to the main lever 31 about the axis X of the pivot shaft 31j. In the first embodiment, the upper coupling portion 31h and the lower coupling portion 32b configure a coupling portion 41. The pivot shaft 31j has a tapered shape, and the two side walls of the lower coupling portion 32b are flexible. Therefore, the upper coupling portion 31h and the lower coupling portion 32b can be coupled to each other with a single action by relative movement along the vertical direction. Specifically, the upper coupling portion 31h and the lower coupling portion 32b are coupled by moving the movable member 32 to the upper side relative to the main lever 31 while aligning the upper coupling portion 31h and the lower coupling portion 32b.

In the first embodiment, the bottom 32f allows the pivoting of the movable member 32 with respect to the main lever 31. Specifically, as shown in FIG. 3A, the bottom 32f has an inclined surface 32h inclined downward and away from the shaft support 32d along the longitudinal direction. The inclined surface 32h is formed on opposite sides of the shaft support 32d in the longitudinal direction since the shaft support 32d is formed at the intermediate portion in the longitudinal direction of the lower coupling portion 32b (engagement plate support 32c).

As shown in FIGS. 3A, 5A, and 5B, the bottom 32f includes a drainage hole 32i that opens outward (towards the lower side in FIG. 3A). The drainage hole 32i is arranged at the lowest position of each inclined surface 32h, that is, at the two longitudinal ends of the lower coupling portion 32b.

A second holding portion 32n is arranged on the distal side in the longitudinal direction of the movable member 32 arranged proximate to the basal end of the main lever 31. A second holding portion 32o is arranged on the distal side in the longitudinal direction of the movable member 32 arranged proximate to the distal end of the main lever 31. As shown in FIGS. 2A and 3A, the second holding portions 32n and 32o each include two second holding hook portions 32j for holding the rubber blade 22 (upper part 22a thereof) in the same manner as the first holding hook portion 31e. The second holding hook portion 32j projects towards the wiping surface 1a from the lower end of the movable member 32.

The rubber blade 22, which is elongated and formed from a rubber material, includes a basal portion and a distal portion, which is opposite the basal portion in the longitudinal direction. The basal portion is closer to the pivot center of the wiper arm 12 in the rubber blade 22. The rubber blade 22 includes the upper part 22a, which is held (gripped) by the first holding hook portion 31e and the second holding hook portion 32j, and a wiping part 22b. The wiping part 22b extends from the upper part 22a downward (direction of wiping surface 1a) and can be inclined with respect to the upper part 22a. Two accommodation grooves 22c, which are open outward (left and right direction in FIG. 2C) in the wiping direction is formed in the side surface of the upper part 22a of the rubber blade 22. A flat plate shaped backing 33 made from a metal plate material serving as a plate spring member is attached (accommodated and held) to the accommodation groove 22c such that the flat plate surface becomes parallel to the wiping direction. The backing 33 disperses the pushing force to the wiping surface 1a, which the rubber blade 22 receives from the wiper arm 12, in the longitudinal direction. A follower end 22d (see FIG. 2A) of the rubber blade 22 projecting toward the two longitudinal ends from the first holding hook portion 31e can thus be elastically deformed in the direction orthogonal to the wiping surface 1a, and the wiping part 22b at the follower end 22d can be pushed against the wiping surface 1a. The first holding hook portion 31e and the second holding hook portion 32j hold the upper part 22a including the backing 33 (accommodation groove 22c) and prevent separation of the backing 33 from the accommodation groove 22c.

Figure 7A:
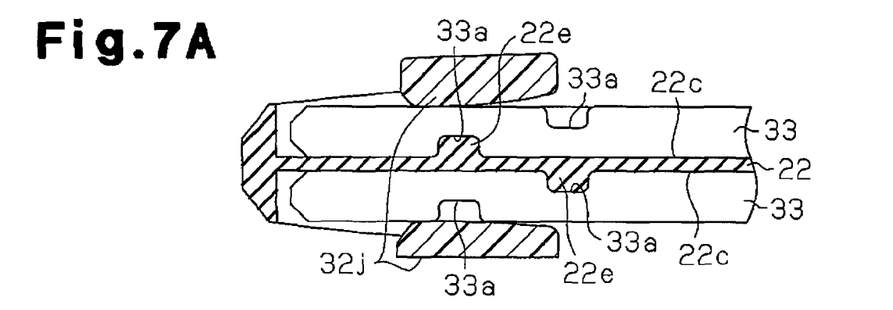
FIG. 7A is a cross-sectional view of a first end of the wiper blade of FIG. 1 taken from the lower side.
Figure 7B:
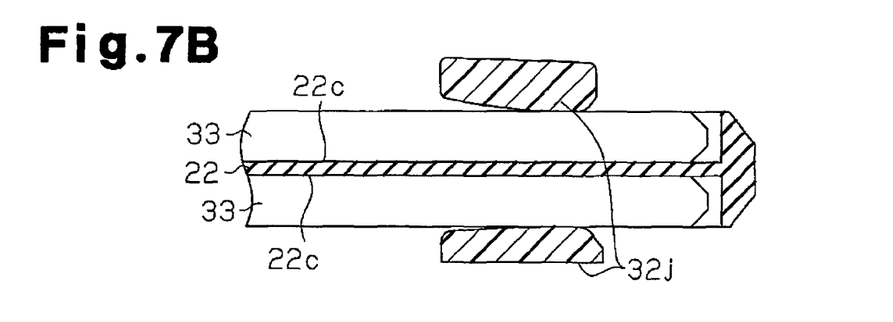
FIG. 7B is a cross-sectional view of a second end of the wiper blade of FIG. 1 taken from the lower side.

The accommodation groove 22c of the first embodiment includes two engagement projections 22e so that the accommodation groove 22c is partially shallow, as shown in FIG. 7A. The engagement projections 22e are formed at positions corresponding to one of the second holding hook portions 32j (in FIG. 2A, second holding hook portion 32j in the movable member 32 on the left side). The two engagement projections 22e are separated from each other in the longitudinal direction within a range of the position corresponding with the second holding hook portion 32j. An engagement recess 33a, to which the engagement projection 22e is fitted, is formed at a position corresponding to the engagement projection 22e of the backing 33. Therefore, the first and second longitudinal ends of the backing 33 having a complex curved shape can be prevented from being reversely coupled by whether or not the engagement projection 22e fits into the engagement recess 33a. Furthermore, since the two backings 33 are the same member, they may be coupled to either one of the two accommodation grooves 22c as long as the first end and the second end are correctly coupled. Therefore, the two engagement recesses 33a is formed in each backing 33. The engagement projection 22e and the engagement recess 33a engage in the longitudinal direction to also prevent the movement of the backing 33 in the longitudinal direction in the accommodation groove 22c. The engagement projection 22e and the engagement recess 33a are arranged at positions corresponding to the second holding hook portion 32j engaged between lock projections 22f, 22g of the rubber blade 22, as will be described later. Therefore, the movement of the backing 33 in the widthwise direction is directly inhibited at the position corresponding to the engagement projection 22e and the engagement recess 33a, and the engagement projection 22e and the engagement recess 33a are prevented from being separated. In FIG. 2A, the engagement projection 22e is not formed at a position corresponding to the second holding hook portion 32j in the movable member 32 on the right side in the accommodation groove 22c, and the engagement recess 33a is also not formed at the same position of the backing 33, as shown in FIG. 7B.

Figure 6:
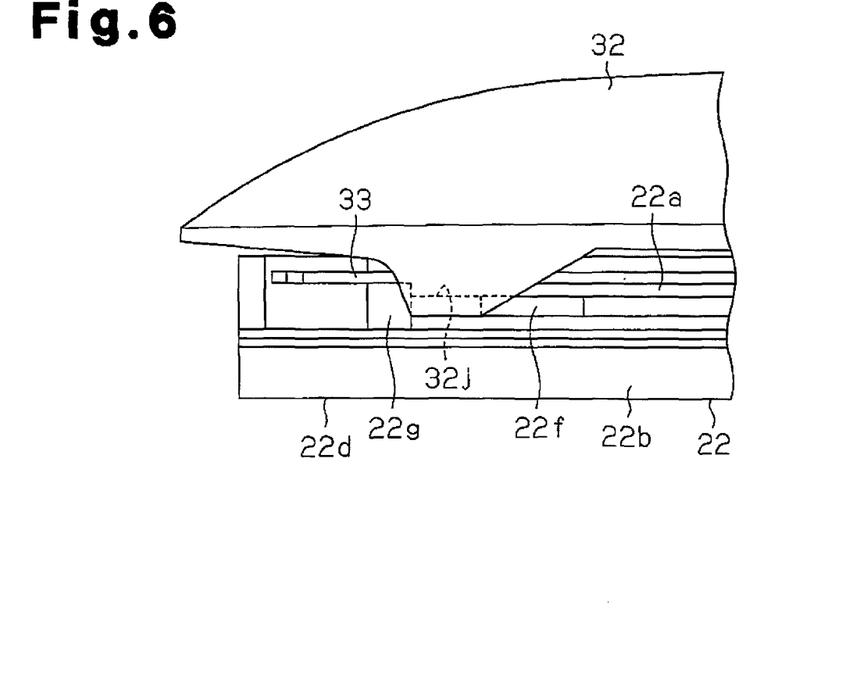
FIG. 6 is a partially enlarged view of a wiper blade of FIG. 1.

The lock projections 22f and 22g that engage with the second holding hook portion 32j in the longitudinal direction in FIG. 2A are formed on opposite sides in the longitudinal direction of the position corresponding to the second holding hook portion 32j in the movable member 32 on the left side in the rubber blade 22 of the first embodiment, as shown in FIG. 6. The lock projection 22f closer to the middle of the rubber blade 22 in the longitudinal direction is inclined so as to project outward from the plane of the drawing as the left side becomes closer. The second holding hook portion 32j is smoothly moved in the longitudinal direction and coupled to a portion between the lock projections 22f, 22g of the rubber blade 22, and strongly engages with the lock projection 22f in the longitudinal direction in such coupled state.

Figure 2D:
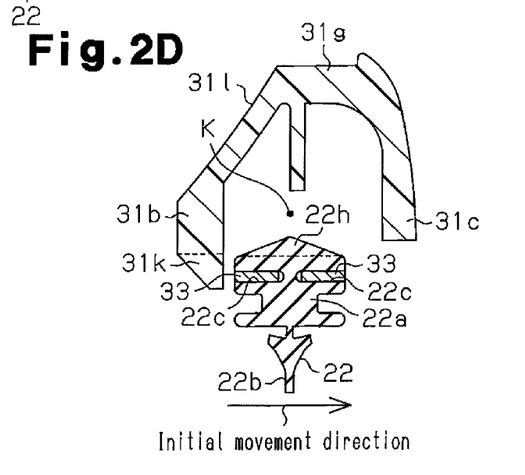
FIG. 2D is a cross-sectional view taken along line 2D-2D in FIG. 2.

As shown in FIGS. 2B and 2D, a thick thickness portion 22h serving as a deformation suppressing portion for suppressing the deformation of the accommodation groove 22c (wall on upper side of accommodation groove 22c) is formed between the first holding hook portions 31e on opposite sides of the rubber blade 22 in the longitudinal direction of the first embodiment. As shown in FIG. 2D, the thick thickness portion 22h is configured by bulging out the wall on the upper side of the accommodation groove 22c toward the upper side. In other words, the thick thickness portion 22h has a thickness greater than the portion held by the first holding hook portions 31e shown in FIG. 2C.

As shown in FIGS. 2A and 2D, a separation prevention projection 31k is arranged between the two first holding hook portions 31e in the longitudinal direction of the main lever 31. The separation prevention projection 31k projects from the lower end of the main lever 31 towards the wiping surface 1a. The separation prevention projection 31k guides the rubber blade 22 so as to permit movement (up and down movement) of the rubber blade 22 in the direction orthogonal to the wiping surface 1a in a void K (space between upper part 22a of rubber blade 22 and inner surface of main lever 31). The separation prevention projection 31k is also arranged at the side wall, that is, the side wall 31b that receives a force in a direction opposite to an initial movement direction that acts on the rubber blade 22 when the wiper 11 starts to move from the wiper stop position. The separation prevention projection 31k inhibits separation of the backing 33 from the accommodation groove 22c. The wiper stop position lies along the lower end of the front glass 1 (wiping surface 1a). As shown in FIG. 2A, the separation prevention projection 31k of the first embodiment is arranged in plurals at positions shifted from the center position in the longitudinal direction between the two first holding hook portions 31e, and at positions bridging over the center position in the longitudinal direction between the two first holding hook portions 31e. In the first embodiment, two separation prevention projections 31k are equally distanced from the center position in the longitudinal direction.

Fin surfaces 31l and 32k (see FIGS. 2C and 2D) for generating a force to push the rubber blade 22 towards the wiping surface 1a when receiving traveling wind as the vehicle travels is formed on the front side of the vehicle (front side in the attached state) at the outer surface of the wiper lever 21 (main lever 31 and movable member 32) of the first embodiment. The fin surfaces 31l and 32k extend over substantially the entire wiper lever 21 in the longitudinal direction. As shown in FIGS. 2C, 2D, 3B, and 3C, the fin surface 31l of the main lever 31 extends from the side wall 31b, positioned on the opposite side of the distal end in the reciprocating direction of the wiper 11, to the upper wall 31g. In the same manner, the fin surface 32k of the movable member 32 forms a continuous (small step in longitudinal direction) outer appearance with the fin surface 31l of the main lever 31.

The first embodiment has the advantages described below.

(1) The coupling portion 41 (upper coupling portion 31h and lower coupling portion 32b) of the main lever 31 and the movable member 32 are arranged at ends located outward in the longitudinal direction of the main lever 31 from the first holding hook portion 31e of the main lever 31. Therefore, the coupling of the main lever 31 and the movable member 32 is not obstructed by the first holding hook portion 31e, and the assembly method is less likely to be restricted. The main lever 31 and the movable member 32 are thus easily coupled. Furthermore, the wiper blade 13 is low since the holding configuration of the rubber blade 22 by the first holding hook portion 31e of the main lever 31 and the coupling portion 41 of the main lever 31 and the movable member 32 are separated from each other in the longitudinal direction. In the first embodiment, the coupling portion 41 of the main lever 31 and the movable member 32 includes the upper coupling portion 31h, which extends downward from the upper wall 31g of the main lever and the lower coupling portion 32b. The upper coupling portion 31h is inserted to the lower coupling portion 32b from above so that the lower coupling portion 32b and the upper coupling portion 31h are pivotally coupled. The coupling portion 41 (upper coupling portion 31h and lower coupling portion 32b) of the main lever 31 and the movable member 32 is coupled by the relatively movement along the vertical direction. Thus, the first holding hook portion 31e does not become an obstruction when coupling the main lever 31 and the movable member 32, and the main lever 31 and the movable member 32 are easily coupled.

(2) The main lever 31 includes the bridge portion 31f for connecting the two side walls 31b and 31c and contacting the upper surface of the rubber blade 22 at a position in the longitudinal direction where the first holding hook portion 31e is arranged. Therefore, the rigidity of the first holding hook portion 31e is increased, and the two first holding hook portions 31e are less likely to open with respect to each other so that the rubber blade 22 is strongly held. In other words, there is a concern for the detachment of the rubber blade 22 since the first holding hook portion 31e has low rigidity if the distance from the upper wall 31g is far and the first holding hook portion 31e easily opens. However, the rigidity is enhanced and the detachment of the rubber blade 22 is prevented by the bridge portion 31f. It is difficult in terms of space to arrange the bridge portion while suppressing the height of the wiper blade 13 low due to the presence of the coupling portion in the two-story structure in which the coupling portion of the main lever and the movable member is arranged at the same position in the longitudinal direction as the holding hook. However, the bridge portion 31f is easily arranged while suppressing the height of the wiper blade 13 low since the coupling portion 41 of the present configuration is arranged at the end position on the outer side in the longitudinal direction of the main lever 31 than the first holding hook portion 31e.

(3) Light weight is achieved while ensuring the necessary rigidity since the gap S is formed between the bridge portion 31f and the upper wall 31g.

(4) Since the main lever 31 including the bridge portion 31f is integrally molded with resin material, a sink (recess) may form at the surface of the main lever 31. However, deformation due to the sink is reduced since the gap S is formed between the bridge portion 31f and the upper wall 31g compared to when the gap S is not formed and filled with resin material.

(5) The main lever 31 is formed with the fin surface 31l for generating the force to push the rubber blade 22 towards the wiping surface 1a side when receiving the traveling wind from one side wall 31b to the upper wall 31g. Therefore, lifting of the rubber blade 22 from the wiping surface 1a is reduced by the fin surface 31l, and the rubber blade 22 carries out satisfactory wiping operation following the wiping surface 1a. In such configuration, the distance (in vertical direction) from the upper wall 31g to the first holding hook portion 31e naturally becomes greater to form the fin surface 31l. However, the two first holding hook portions 31e are less likely to open with respect to each other as the rigidity of the first holding hook portions 31e is enhanced by the bridge portion 31f. The rubber blade 22 is thus strongly held.

The first embodiment may be modified as described below.

In the first embodiment, the support surface 32g having an arcuate recess shaped cross-section is formed at the bottom 32f. The support surface 32g pivotally contacts (slidably contacts) substantially the lower half of the pivot shaft 31j to inhibit upward movement of the movable member 32 with respect to the main lever 31. The configuration of the support surface 32g is not limited thereto, and similar function may be embodied with other configurations.

Figure 8A:
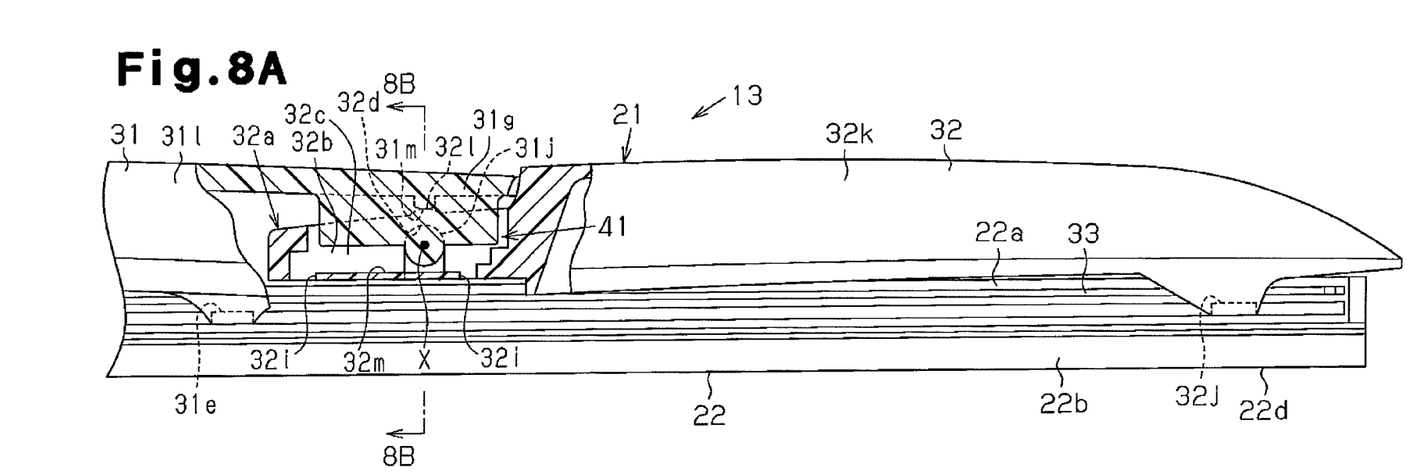
FIG. 8A is an enlarged partial cross-sectional view of a wiper blade of another example.
Figure 8B:
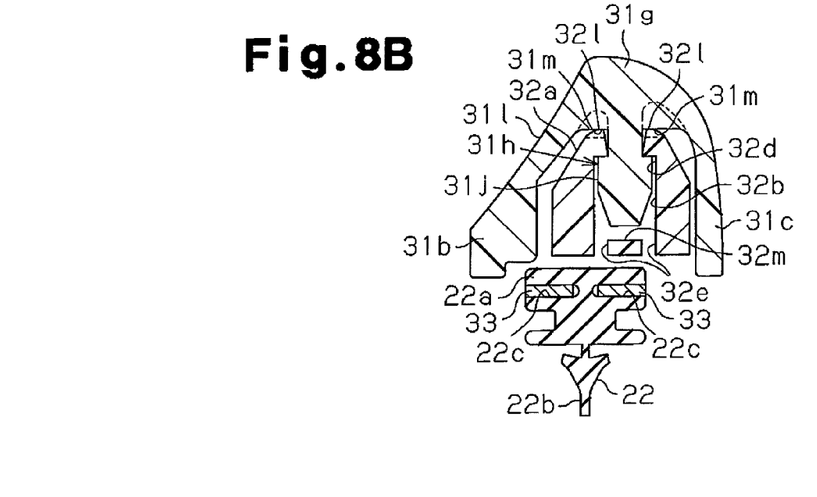
FIG. 8B is a cross-sectional view taken along line 8B-8B in FIG. 8A.
Figure 9:
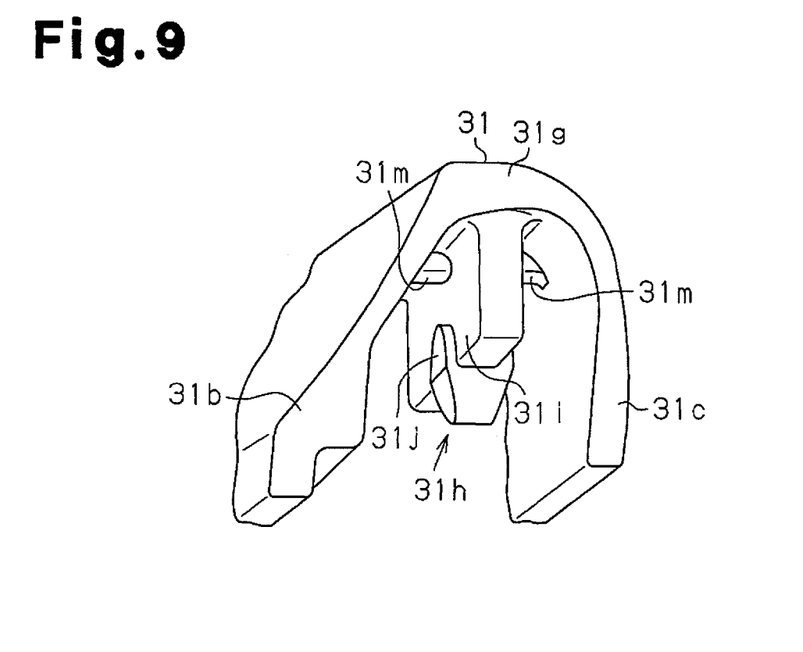
FIG. 9 is a partially enlarged perspective view showing the upper coupling portion of the main lever of another example.
Figure 10:
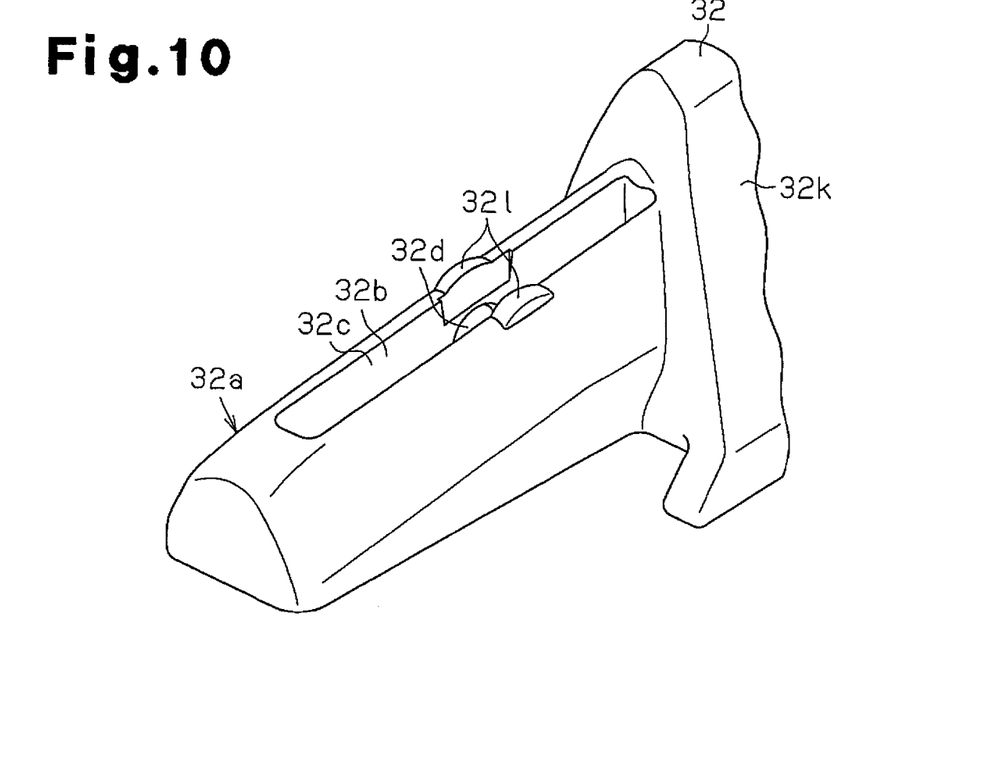
FIG. 10 is a partially enlarged perspective view showing the lower coupling portion of the movable member of another example.

For instance, the configuration of the support surface 32g may be changed as shown in FIGS. 8 to 10. Specifically, as shown in FIGS. 8A, 8B, and 9, two supporting projections 31m is formed at a position corresponding to the pivot shaft 31j at the upper wall 31g of the main lever 31. The two supporting projections 31m are arranged along the wiping direction (widthwise direction of main lever), and each supporting projection 31m is slightly projected out to the lower side from the upper wall 31g. As shown in FIGS. 8A, 8B, and 10, in the extended portion 32a of the movable member 32, an arcuate supporting projection 32l having an arcuate projecting shape to the upper side is formed at a position corresponding to the supporting projection 31m with the pivot shaft 31j inserted to the shaft support 32d. The arcuate supporting projection 32l inhibits the movement to the upper side of the movable member 32 with respect to the main lever 31 by pivotally contacting (slidably contacting) the supporting projection 31m. With such configuration as well, the movable member 32 is pivotally supported with respect to the main lever 31, and advantages similar to the advantages of the first embodiment are obtained. In this example (see FIGS. 8A to 10), the bottom 32f of the lower coupling portion 32b is formed so as not to contact (slidably contact) the pivot shaft 31*j*. The bottom 32*f* in this example is formed to a simple plate shape having a constant plate thickness in the vertical direction without the inclined surface 32*h* of the first embodiment, and the drainage hole 32*i* is formed at both side ends in the longitudinal direction.

In the first embodiment, the main lever 31 includes the bridge portion 31*f*, which connects the two side walls 31*b*, 31*c*, and which is brought into contact with the upper surface of the rubber blade 22, at a position in the longitudinal direction where the first holding hook portion 31*e* is arranged. The present invention is not limited thereto, and the configuration may be changed to that in which the bridge portion 31*f* is omitted.

Although not particularly mentioned in the first embodiment, a bridge portion for connecting two side walls of the movable member 32 may be formed at a position where the second holding hook portion 32*j* is formed in the movable member 32, similar to the bridge portion 31*f* of the main lever 31. The two second holding hook portions 32*j* are thus less likely to open with respect to each other as the rigidity of the second holding hook portion 32*j* enhances, and the rubber blade 22 can be strongly held. Furthermore, while slidably coupling the second holding hook portion 32*j* to the rubber blade 22 while riding over the inclined surface of the lock projection 22*f* as in the first embodiment, a force of opening the second holding hook portion 32*j* (spreading the spacing in the widthwise direction) is applied. However, the deformation of the second holding hook portion 32*j* in this case is suppressed as the bridge portion is formed, and the rubber blade 22 is strongly held by the second holding hook portion 32*j* in the coupled state.

In the first embodiment, the fin surfaces 31*l* and 32*k* for generating the force of pushing the rubber blade 22 towards the wiping surfaces 1*a* when receiving traveling wind are formed in the wiper lever 21 (main lever 31 and movable member 32), but the first embodiment is not limited thereto. For instance, the fin surfaces 31*l*, 32*k* may not be formed in the wiper lever.

In the first embodiment, the drainage hole 32*i* that extends to the outside is arranged at the bottom 32*f* of the lower coupling portion 32*b*, but the first embodiment is not limited thereto. The drainage hole 32*i* does not have to be arranged at the bottom 32*f*.

In the first embodiment, the coupling portion 41 is configured by the upper coupling portion 31*h* (engagement plate 31*i* and pivot shaft 31*j*) and the lower coupling portion 32*b* (engagement plate support 32*c* and shaft support 32*d*), but the first embodiment is not limited thereto. The coupling portion 41 may be of other configurations as long as it is arranged at the end outward from the first holding hook portion 31*e* in the longitudinal direction of the main lever 31. For instance, the coupling portion 41 may not include the engagement plate 31*i* and the engagement plate support 32*c*. In other words, the coupling portion 41 does not have to have a structure for restricting the shakiness in the thicknesswise direction (i.e., wiping direction). Furthermore, the main lever 31 may include the lower coupling portion, and the movable member 32 may include the upper coupling portion.

In the first embodiment, the deformation suppressing portion (thick thickness portion 22*h*) for suppressing the deformation of the accommodation groove 22*c* is arranged between the first holding hook portions 31*e* on opposite sides in the longitudinal direction of the rubber blade 22, but the first embodiment is not limited thereto. The deformation suppressing portion may be eliminated, or the deformation suppressing portion may be arranged over the entire length of the rubber blade 22. The deformation suppressing portion may be obtained by forming a portion corresponding to the thick thickness portion 22*h* with a different member and attaching the same to the upper part 22*a* afterwards with an adhesive or the like as long as the deformation of the accommodation groove 22*c* can be suppressed.

In the first embodiment, the separation prevention projection 31*k* for inhibiting the detachment of the backing 33 from the accommodation groove 22*c* is arranged between the first holding hook portions 31*e* on both sides in the longitudinal direction of the main lever 31, but the first embodiment is not limited thereto. The separation prevention projection 31*k* is may be eliminated.

In the first embodiment, the wiper lever 21 includes the main lever 31 and two movable members 32, but the first embodiment is not limited thereto. The wiper lever 21 may include only one movable member 32 at one longitudinal end. In other words, the movable member 32 may be arranged on at least one of the ends in the longitudinal direction of the main lever 31.

In the first embodiment, the main lever 31 and the movable member 32 are made of resin material, but the first embodiment is not limited thereto. The main lever 31 and the movable member 32 may be configured by a metal material, or may have one portion configured by a metal material.

A second embodiment of the present invention will now be described with reference to FIGS. 11 to 12B centering on differences from the first embodiment.

Figure 11:
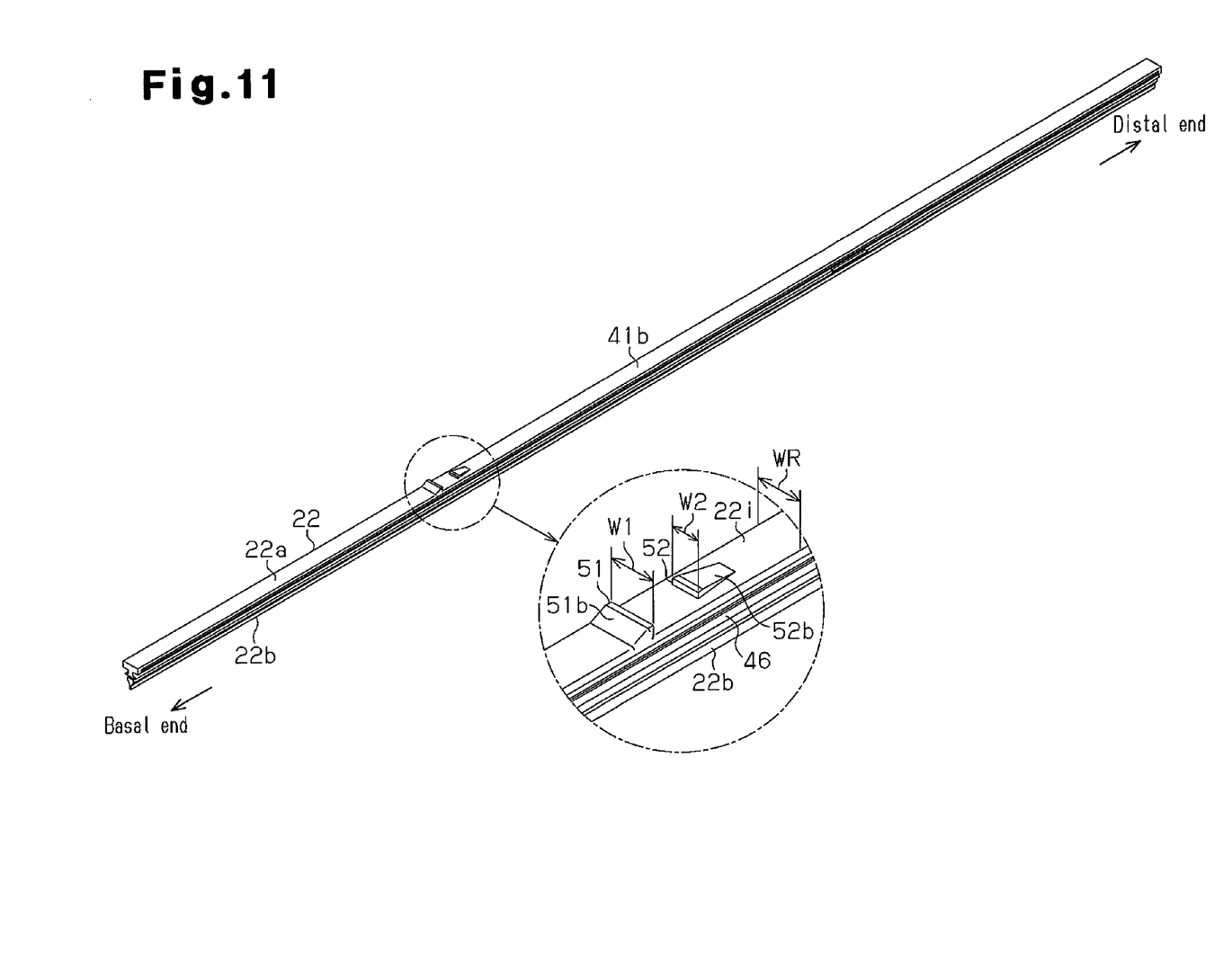
FIG. 11 is a perspective view showing a rubber blade of a vehicle wiper according to a second embodiment of the present invention.
Figure 12A:
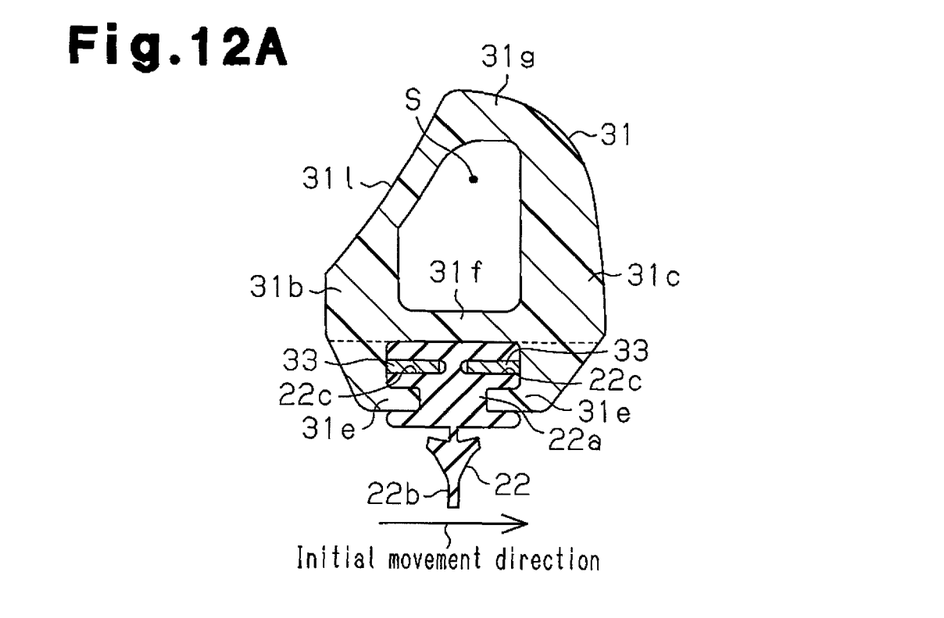
FIG. 12A is a cross-sectional view of the wiper blade including the rubber blade of FIG. 11.
Figure 12B:
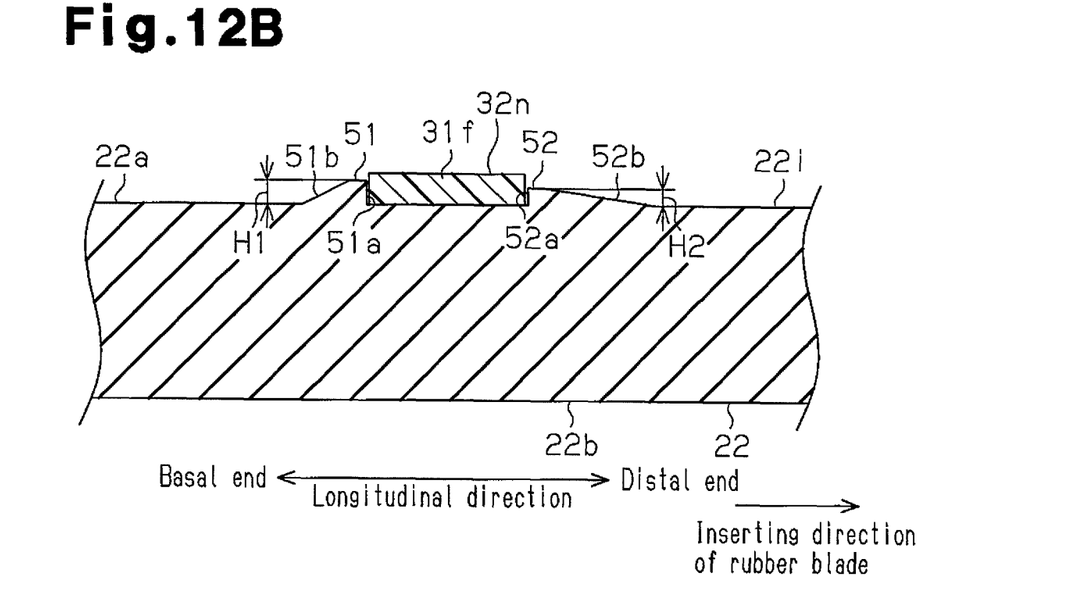
FIG. 12B is a cross-sectional view taken along the longitudinal direction near the first holding portion on the basal side.

As shown in FIGS. 11 and 12B, a first engagement projection 51 and a second engagement projection 52 are formed at the upper surface 22*i* of the upper part 22*a* of the rubber blade 22. The first and second engagement projections 51 and 52 are arranged at positions closer to the basal end than the middle in the longitudinal direction of the rubber blade 22. Specifically, the first engagement projection 51 and the second engagement projection 52 are aligned with each other in the longitudinal direction at positions corresponding to the bridge portion 31*f* toward the basal end of the main lever 31. The first engagement projection 51 of the first engagement projection 51 and the second engagement projection 52 is positioned toward the basal end, and the second engagement projection 52 is positioned toward the middle in the longitudinal direction. As shown in FIG. 12B, the bridge portion 31*f* of the main lever 31 is positioned between the first and second engagement projections 51 and 52. More specifically, the bridge portion 31*f* is engaged with the first and second engagement projections 51 and 52 in the longitudinal direction. The first and second engagement projections 51 and 52 are not arranged in the area corresponding to the bridge portion 31*f* of the first holding portion 31*o* at the positions closer to the distal end of the rubber blade 22, and the bridge portion 31*f* is not engaged with the rubber blade 22 in the longitudinal direction.

A contacting surface 51*a* of the first engagement projection 51 contacts the basal end (outer end) of the bridge portion 31*f* in the longitudinal direction, and a contacting surface 52*a* of the second engagement projection 52 contacts the distal end (inner end) of the bridge portion 31*f* in the longitudinal direction. The contacting surfaces 51*a* and 52*a* are planes extending along a direction orthogonal to the longitudinal direction of the rubber blade 22. The distance between the contacting surfaces 51*a* and 52*a* is slightly smaller than the dimension in the longitudinal direction of the bridge portion 31*f*. The height H2 (dimension of the contacting surface 52*a* in the vertical direction) of the second engagement projection 52 is smaller than the height H1 (dimension of the contacting surface 51*a* in the vertical direction) of the first engagement projection 51. The first engagement projection 51 includes an inclined surface 51b inclined such that the height increases towards the middle in the longitudinal direction of the rubber blade 22, and the second engagement projection 52 includes an inclined surface 52b inclined such that the height increases towards the basal longitudinal end of the rubber blade 22. The inclination of the inclined surface 52b is more gradual than the inclination of the inclined surface 51b.

Furthermore, as shown in FIG. 11, the dimension W1 in the widthwise direction of the first engagement projection 51 is equal to the dimension WR in the widthwise direction of the upper surface 22i of the upper part 22a. In other words, the first engagement projection 51 is formed over the entire widthwise direction of the upper surface 22i. The dimension W2 in the widthwise direction of the second engagement projection 52 is smaller than the dimension W1 in the widthwise direction of the first engagement projection 51. The inclined surface 52b of the second engagement projection 52 has a shape in which the dimension in the widthwise direction becomes wider from the distal end towards the basal end.

When coupling the rubber blade 22 to the main lever 31, the upper part 22a of the rubber blade 22 is inserted along the longitudinal direction in the order of the first holding portion 31n and the first holding portion 31o from the distal end. In this case, the second engagement projection 52 positioned on the front side in the inserting direction approaches the bridge portion 31f of the first holding portion 31n before the first engagement projection 51. The bridge portion 31f goes over the second engagement projection 52 while slidably contacting the inclined surface 52b and is fitted between the first and second engagement projections 51 and 52. The height H2 of the second engagement projection 52 on the front side in the inserting direction is set to be smaller than the height H1 of the first engagement projection 51. Thus, the bridge portion 31f of the first holding portion 31n can easily go over the second engagement projection 52. The dimension W2 in the widthwise direction of the second engagement projection 52 on the front side in the inserting direction is set to be smaller than the dimension W1 in the widthwise direction of the first engagement projection 51. Therefore, the friction of when the bridge portion 31f of the first holding portion 31n goes over the second engagement projection 52 can be reduced, whereby the bridge portion 31f can more easily go over the second engagement projection 52. In the second embodiment, the rubber blade 22 can be easily coupled to the main lever 31 by the dimension setting described above.

The operation of the second embodiment will be now be described.

The first and second engagement projections 51 and 52 of the rubber blade 22 are brought into contact in the longitudinal direction with opposite ends in the longitudinal direction of the bridge portion 31f of the first holding portion 31n so that the movement of the rubber blade 22 in the longitudinal direction can be restricted. The rubber blade 22 is thus prevented from being separated from the first holding portions 31n and 31o in the longitudinal direction. The configuration for restricting the movement of the rubber blade 22 in the longitudinal direction is thus obtained by using the bridge portion 31f for pushing the rubber blade 22 against the wiping surface 1a. Therefore, in the wiper blade 13 of the second embodiment, the movement restriction is realized without separately adding a configuration for the movement restriction to the main lever 31. The upper surface 22i has a high degree of freedom of design in shape and size compared to the interior of the holding groove 41c of the rubber blade 22 so that the first and second engagement projections 51, 52 can be easily enlarged in the widthwise direction at the upper surface 22i. The movement restriction of the rubber blade 22 in the longitudinal direction is more ensured that a configuration that restricts the movement of the rubber blade 22 with the distal end of the first holding hook portion 31e.

The rubber blade 22 follows the curve of the wiping surface 1a corresponding to the wiping position over the entire longitudinal direction thereof when wiping the wiping surface 1a. In the second embodiment, the movement of the rubber blade 22 in the longitudinal direction is restricted with only the first holding portion 31n on the basal side and is permitted with the first holding portion 31o on the distal side so that the following property of the rubber blade 22 to the curve is enhanced.

When changing the position of the vehicle wiper 10 from the lock back state (state in which the wiper arm 12 is standing with respect to the wiping surface 1a) to the normal usage state (state in which the rubber blade 22 is brought into contact with the wiping surface 1a), the basal end of the rubber blade 22 may strike the wiping surface 1a. In the second embodiment, however, the distance to the first holding portion 31n for the movement restriction from the basal end of the rubber blade 22 that collapses with the wiper arm 12 can be shortened since the movement in the longitudinal direction is restricted with the first holding portion 31n on the basal side and not on the distal side. As a result, the impact the first holding portion 31n on the basal side received when the basal end of the rubber blade 22 hits the wiping surface 1a is small compared to when the movement of the rubber blade 22 in the longitudinal direction is restricted by the first holding portion 31o on the distal side. Therefore, the rubber blade 22 is more unlikely to be separated from the first holding portion 31n.

The second embodiment has the advantages described below.

(6) In the second embodiment, which uses reference characters in correspondence with the first embodiment, the bridge portion 31f is formed in each of the first holding portions 31n and 31o. The first engagement projection 51 and the second engagement projection 52 that engage opposite ends in the longitudinal direction of the bridge portion 31f of the first holding portion 31n in the longitudinal direction are arranged at the upper surface 22i of the rubber blade 22. The movement of the rubber blade 22 in the longitudinal direction is restricted by the engagement of the first and second engagement projections 51 and 52 and the bridge portion 31f in the longitudinal direction. That is, the movement restriction is realized without separately adding a configuration for restricting the movement of the rubber blade 22 in the longitudinal direction to the main lever 31 by using the bridge portion 31f for pushing the rubber blade 22 against the wiping surface 1a. The first and second engagement projections 51 and 52 are easily enlarged in the widthwise direction at the upper surface 22i since the upper surface 22i of the rubber blade 22 has more degree of freedom for design than the holding groove 41c of the rubber blade 22. Therefore, the configuration of the second embodiment strongly restricts the movement of the rubber blade 22 in the longitudinal direction compared to the configuration of restricting the movement of the rubber blade 22 with the distal end of the first holding hook portion 31e.

(7) In the second embodiment, the height H2 of the second engagement projection 52 arranged on the front side in the inserting direction of the rubber blade 22 is smaller than the height H1 of the first engagement projection 51 in the first and second engagement projections 51 and 52. Therefore, when inserting the rubber blade 22 in the longitudinal direction to the first holding portion 31n, 31o, the bridge portion 31f easily goes over the second engagement projection 52 on the front side in the inserting direction so that the rubber blade 22 is easily coupled to the main lever 31.

(8) In the second embodiment, the dimension W2 in the widthwise direction of the second engagement projection 52 arranged on the front side in the inserting direction of the rubber blade 22 is smaller than the dimension W1 in the widthwise direction of the first engagement projection 51 in the first and second engagement projections 51 and 52. Therefore, the friction when the bridge portion 31f goes over the second engagement projection 52 on the front side in the inserting direction is reduced when inserting the rubber blade 22 in the longitudinal direction to the first holding portion 31n, 31o of the main lever 31 so that the bridge portion 31f easily goes over the second engagement projection 52. Therefore, the rubber blade 22 is easily coupled to the main lever 31.

(9) In the second embodiment, the bridge portion 31f for pushing the rubber blade 22 against the wiping surface 1a is formed inside the main lever 31 having a substantially U-shaped cross-section, that is, while being covered by the upper wall 31g and the side walls 31b and 31c. The first and second engagement projections 51 and 52 for the restriction of movement in the longitudinal direction of the rubber blade 22 using the bridge portion 31f are also formed inside the main lever 31. This improves the outer appearance of the wiper blade 13 and suppresses deterioration of the material of the first and second engagement projections 51 and 52 caused by ultraviolet rays or the like.

The second embodiment may be modified as described below.

In the second embodiment, the first and second engagement projections 51 and 52 are configured to engage the first holding portion 31n on the basal side. However, the first and second engagement projections 51 and 52 may be configured to engage the first holding portion 31o on the distal side.

The heights H1 and H2 and the dimensions W1 and W2 in the widthwise direction, as well as the shape of the first and second engagement projections 51 and 52 may be changed as required.

In the second embodiment, two holding portions 31n and 31o are arranged in the main lever 31, but three or more holding portions may be arranged.

The shape of the main lever 31 and the rubber blade 22 in the second embodiment may be changed as required.

The first and second embodiments may be modified as described below.

In the first and second embodiments, the gap S is formed between the bridge portion 31f and the upper wall 31g, but the bridge portion connected to the upper wall 31g may be arranged so as not form the gap S.

In the first and second embodiments, the main lever 31 including the bridge portion 31f is integrally molded with a resin material, but the bridge portion may be formed with a separate member and arranged in the main lever 31 through an adhesive, insert molding, or the like. The first holding hook portion 31e may be formed with a separate member and arranged in the main lever 31 through an adhesive, insert molding, or the like.

In the first and second embodiments, the present invention is applied to the vehicle wiper 11 for wiping the front glass of the vehicle, but may also be applied to a wiper for wiping the rear glass of the vehicle.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

The invention claimed is:

1. A wiper blade comprising:
a main lever coupled to a wiper arm, the main lever including a longitudinally intermediate portion, a first end portion and a first holding portion, the first end portion including a first end face, the first end face defined by at least one of two longitudinal end faces of the main lever, the first holding portion being arranged closer to the first end face than the longitudinally intermediate portion;
a movable member pivotally coupled to the first end portion and including a second holding portion;
a rubber blade configured for wiping a surface of a vehicle windshield and held by the first holding portion and the second holding portion; and
a coupling portion arranged between the main lever and the movable member, the coupling portion including an upper coupling portion and a lower coupling portion, the main lever including the upper coupling portion extending downward from an upper wall of the main lever, the movable member including the lower coupling portion and the lower coupling portion being integrally formed with the movable member, the lower coupling portion facing the upper coupling portion; wherein
the upper coupling portion and the lower coupling portion are coupled to each other and pivot relative to each other about a pivot axis, the pivot axis is located along the main lever between the first holding portion and the first end face, the upper coupling portion is arranged above the lower coupling portion, and the upper coupling portion and the lower coupling portion are configured to couple the main lever and the movable member together pivotally by inserting the upper coupling portion into the lower coupling portion through relative movement to each other in a vertical direction that is perpendicular to the wiping surface of the rubber blade.

2. The wiper blade according to claim 1, wherein
the main lever includes two side walls, which face toward each other in a direction orthogonal to the longitudinal direction, and the upper wall, which connects the two side walls, so as to have a substantially U-shaped cross-section in the direction orthogonal to the longitudinal direction;
the first holding portion includes two first holding hook portions respectively extending downward from the two side walls and bending with their distal ends extending toward each other to hold the rubber blade; and
the main lever includes a bridge portion that connects the two side walls and contacts an upper surface of the rubber blade at a position in the longitudinal direction that corresponds to the two first holding hook portions.

3. The wiper blade according to claim 2, wherein a gap is formed between the bridge portion and the upper wall.

4. The wiper blade according to claim 3, wherein the main lever, which includes the bridge portion, is integrally molded from a resin material.

5. The wiper blade according to claim 2, wherein the main lever includes a fin surface extending from at least one of the side walls to the upper wall, and the fin surface generates a force that pushes the rubber blade towards a wiping surface when receiving wind.

6. The wiper blade according to claim 1, wherein the upper coupling portion includes a pivot shaft and the upper coupling portion and the lower coupling portion are pivotally connected together about a pivot shaft that extends transversely to the longitudinal direction of the main lever.

7. The wiper blade according to claim 1, wherein the upper coupling portion and the lower coupling portion are pivotally connected together about a pivot shaft and portions of the upper and lower coupling portions adjacent the pivot shaft are spaced apart and configured to permit pivoting of the upper coupling portion relative to the lower coupling portion.

8. The wiper blade according to claim 1, wherein
the lower coupling portion includes two wall portions that face each other and are spaced apart and a bottom portion connects the two wall portions; and
the upper coupling portion extends downward and is arranged between the two wall portions.

9. A wiper blade comprising:
a main lever coupled to a wiper arm, the main lever including a longitudinally intermediate portion, a first end portion and a first holding portion, the first end portion including a first end face, the first end face defined by at least one of two longitudinal end faces of the main lever, the first holding portion being arranged closer to the first end than the longitudinally intermediate portion;
a movable member pivotally coupled to the first end portion and including a second holding portion;
a rubber blade configured for wiping a surface of a vehicle windshield and held by the first holding portion and the second holding portion; and
a coupling portion arranged between the main lever and the movable member, the coupling portion including an upper coupling portion and a lower coupling portion, the main lever including the upper coupling portion extending downward from an upper wall of the main lever, the movable member including the lower coupling portion and the lower coupling portion being integrally formed with the movable member, wherein
the upper coupling portion and the lower coupling portion are coupled to each other and pivot relative to each other about a pivot axis, the pivot axis being located along the main lever between the first holding portion and the first end face, the upper coupling portion and the lower coupling portion extend longitudinally in a common direction and pivotally couple the main lever and the movable member together by inserting the upper coupling portion from above downward into the lower coupling portion through a relative movement in a vertical direction that is perpendicular to the common longitudinal direction of the upper coupling portion and the lower coupling portion.

10. The wiper blade according to claim 9, wherein the upper coupling portion includes a pivot shaft and the upper coupling portion and the lower coupling portion are pivotally connected together about a pivot shaft that extends transversely to the longitudinal direction of the main lever.

11. The wiper blade according to claim 9, wherein the upper coupling portion and the lower coupling portion are pivotally connected together about a pivot shaft and portions of the upper and lower coupling portions adjacent the pivot shaft are spaced apart and configured to permit pivoting of the upper coupling portion relative to the lower coupling portion.

12. The wiper blade according to claim 9, wherein
the main lever includes two side walls, which face toward each other in a direction orthogonal to the longitudinal direction, and the upper wall, which connects the two side walls, so as to have a substantially U-shaped cross-section in the direction orthogonal to the longitudinal direction;
the first holding portion includes two first holding hook portions respectively extending downward from the two side walls and bending with their distal ends extending toward each other to hold the rubber blade; and
the main lever includes a bridge portion that connects the two side walls and contacts an upper surface of the rubber blade at a position in the longitudinal direction that corresponds to the two first holding hook portions.

13. The wiper blade according to claim 12, wherein a gap is formed between the bridge portion and the upper wall.

14. The wiper blade according to claim 13, wherein the main lever, which includes the bridge portion, is integrally molded from a resin material.

15. The wiper blade according to claim 9, wherein
the lower coupling portion includes two wall portions that face each other and are spaced apart and a bottom portion connects the two wall portions; and
the upper coupling portion extends downward and is arranged between the two wall portions.

* * * * *